United States Patent [19]
Lo et al.

[11] Patent Number: 5,424,801
[45] Date of Patent: Jun. 13, 1995

[54] DUAL MODE 2D/3D PRINTER

[75] Inventors: Allen K. W. Lo, Dunwoody; Nicholas L. Lam, Norcross, both of Ga.

[73] Assignee: Image Technology International, Inc., Norcross, Ga.

[21] Appl. No.: 189,786

[22] Filed: Feb. 1, 1994

[51] Int. Cl.⁶ .................... G03B 27/32; G03B 35/14
[52] U.S. Cl. .................................................. 355/22
[58] Field of Search .......................... 355/22; 354/111

[56] References Cited

U.S. PATENT DOCUMENTS

| | | | |
|---|---|---|---|
| 4,101,210 | 7/1978 | Lo et al. | 353/7 |
| 4,120,562 | 10/1978 | Lo et al. | 350/130 |
| 4,903,069 | 2/1990 | Lam | 355/22 |
| 5,019,855 | 5/1991 | Lam | 355/22 |
| 5,028,950 | 7/1991 | Fritsch | 355/22 |
| 5,111,236 | 5/1992 | Lo | 355/22 |
| 5,113,213 | 5/1992 | Sandor et al. | 355/22 |
| 5,294,951 | 3/1994 | Lo | 354/111 |

OTHER PUBLICATIONS

"Three-Dimensional Imaging Engineering" Takanori Okoshi 1976.
"Applied Optics and Optical Engineering" vol. II The Detection of Light and Infrared Radiation (1965).

*Primary Examiner*—Richard A. Wintercorn
*Attorney, Agent, or Firm*—Deveau, Colton & Marquis

[57] ABSTRACT

A dual-mode photographic printer which can be used to make both two-dimensional and three-dimensional photographs having two print material cassettes which separately supply 2D and 3D print materials. An easel is transported to one of the cassettes to pick up a section of print material according to the printing mode. The same easel moves the print material to different locations for 3D printing. A chemical processor is included in the printer so that photo-processing is part of the on-line printing process.

11 Claims, 14 Drawing Sheets

DUAL MODE 2D/3D PRINTER

FIELD OF THE INVENTION

The present invention relates generally to an optical apparatus for producing photographs, and more specifically to a photographic printer which can be used to produce two-dimensional photographs on regular photographic paper and three-dimensional photographs on lenticular print materials.

BACKGROUND OF THE INVENTION

In lenticular-type three dimensional (3D) photography, the basic process involves taking a plurality of two-dimensional (2D) views from a number of horizontally-spaced vantage points, and compressing these 2D views onto each of the lenticules of a lenticular screen to form a 3D composite image of the scene. The lenticular screen is a sheet of transparent material with the front side embossed with an array of cylindrical lenses, and with the back side coated with a photosensitive emulsion or with the back side attached to a photographic film or paper. If the back side of the lenticular screen is coated with a photosensitive emulsion, usually it is also coated with an additional white coating which serves as a reflective layer and, at the same time, as a protective backing. The 2D views captured by a camera are recorded on a photographic film on a plurality of frames.

The basic process of producing a lenticular 3D photograph from a set of 2D frames has been discussed in detail in a number of books and patent disclosures. For example, L. Dudley in "Applied Optics and Optical Engineering" (R. Kingslake, 1965), discusses a printing method where the lenticular screen is transported intermittently so that each of the 2D images recorded on film is exposed at a different angle. T. Okoshi, in "Three-Dimensional Imaging Techniques" (1978), discusses the use of several projectors to expose a plurality of 2D images onto the photographic emulsion. U.S. Pat. No. 4,120,562 (Lo et al.) discloses a scanning method for exposing a number of 2D images at different projection angles. U.S. Pat. No. 4,101,210 (Lo et al.) discloses a method of filling the film area underlying the lenticules by using a plurality of projection lenses. U.S. Pat. No. 5,028,950 (Fritsch) discloses a dual-stage 3D photographic printer in which the examination of the images on film and the projection of images onto the print material are carried out in two separate mechanical stages to allow for the time difference between the two parts of a printing process. U.S. Pat. No. 4,903,069 (Lam) discloses the printing of a machine-readable code on the film at the time of picture taking to indicate the focusing distance.

The basic process in 3D printing involves the projection of a plurality of images in a set of negatives recorded on film, through a projection lens, onto the lenticular print material at different projection angles. In order to accomplish the projections at different angles, a 3D photographic printer must transport at least two of three important elements (the negatives, the projection lens and the print material) to different positions to produce a 3D photograph. By contrast, all of the above-mentioned elements can be stationary throughout a 2D printing process.

In both 2D and 3D printing, the color and density of a negative must be examined, either automatically by an analyzing means or visually by an operator, so that the exposure time and the setting of color filters in the lamphouse can be determined prior to printing.

In 3D printing, because the plurality of images in a set of negatives must be projected onto a single piece of print material to produce a composite 3D photograph, it is required that these images be properly aligned. Thus, it is advantageous to acquire all these images and channel the data to the computer which locates the relative positions of the images for image alignment. In contrast, image alignment is not necessary in 2D printing because only one image is projected onto the print material to produce a 2D photograph.

Presently, one must use a dedicated 2D printer to make 2D prints and use a dedicated 3D printer to make 3D pits. It would be desirable to have a dual-mode printer which can be used to make both 2D and 3D pits, thereby saving time, money, and space. It is to the provision of such a dual-mode printer that the present invention is primarily directed.

SUMMARY OF THE INVENTION

Briefly described, in a preferred form the present invention comprises a dual-mode photographic printer for producing 2D and 3D photographs from 2D print material and 3D print material. The printer includes a print material storage and dispensing means for storing 2D print material and 3D print material and for selectively dispensing 2D print material and 3D print material. The printer also includes a movable easel associated with the print material storage and dispensing means for supporting 2D print material in a position for printing 2D photographs. The movable easel also is provided for supporting 3D print material in a first 3D printing position, for moving the 3D print material from the first 3D printing position to at least a second 3D printing position, and for supporting the 3D print material in the at least second 3D printing position. The dual-mode printer also includes a film carder for transporting photographic film and for supporting the photographic film. A lamphouse is provided for illuminating the photographic film and a movable, variable magnification projection lens means is provided for, in cooperation with the lamphouse, projecting an image or images from the photographic film onto the print material.

The photographic printer, according to the present invention, is a dual-mode printer which can be used to make both two-dimensional and three-dimensional photographs. In spite of the fact that 2D and 3D printing processes are vastly different, surprisingly, many of the components in the machine are shared by 2D printing and 3D printing.

Preferably, the lamphouse and the print material storage and dispensing means are kept stationary. In the 3D printing mode, different image frames in a set of negatives (photographic film) must be moved to the exposure position and the projection lens means and a section of print material are transported to different positions so that the different images in a set of negatives are projected through the projection lens means at different angles. With print material storage and dispensing means being kept stationary in the printer, the movable easel is used to pick up the proper print material from the storage and dispensing means according to the printing mode, and the easel is used to move the 3D print material to different positions to receive image projections at different angles.

Preferably, a chemical processor is included in the printer so that photo-processing is part of the on-line printing process.

A dual-mode photographic printer according to the present invention has the advantages of being compact, easily operated, economical to operate, and saves time, money and space.

Accordingly, it is an object of the present invention to provide a dual-mode photographic printer which is capable of printing both 2D and 3D photographs.

It is another object of the present invention to provide a dual-mode photographic printer for printing both 2D and 3D photographs without requiring that the operator manually change out one type of print material for another.

It is yet a further object of the present invention to provide a dual-mode photographic printer which is compact, easily operated, and economical in use.

These and other objects, features, and advantages of the present invention will become apparent upon reading the following specification in conjunction with the accompanying drawing figures.

The preferred embodiment of the dual-mode printer shah be explained in reference to FIG. 1 to FIG. 11.

DETAILED DESCRIPTION OF THE PREFERRED EMBODIMENTS

Figure 1:
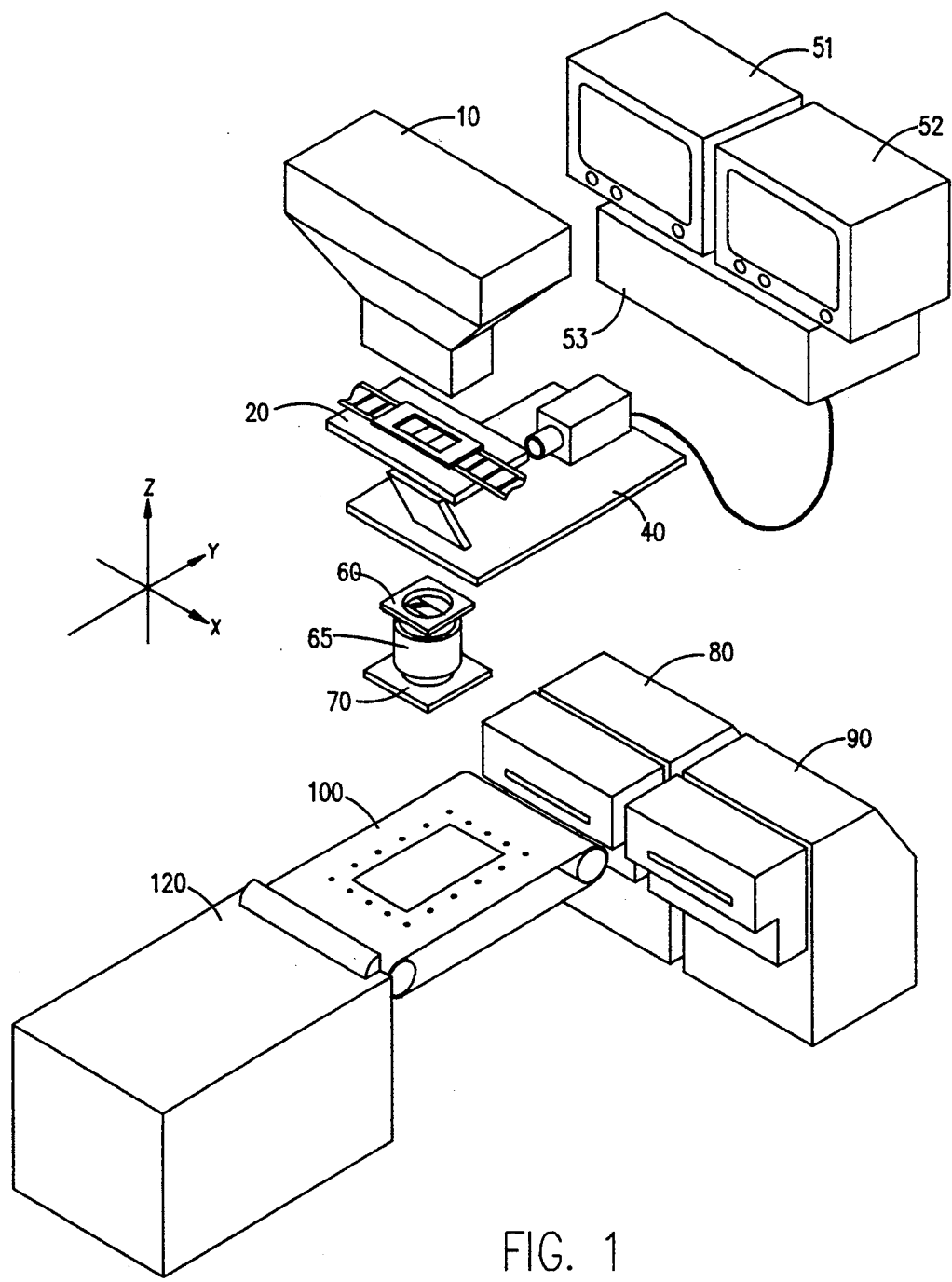
FIG. 1 is a schematic isometric representation of a printer according to a preferred form of the invention.

In FIG. 1, numeral 10 denotes a lamphouse which is controlled by a computer 53 regarding the color balancing of the lamphouse output according to the color and density of the negative. Numeral 20 denotes a film carder which engages one or more rolls or a section of film and transports the film to a proper position for exposure. Numeral 40 denotes an optical assembly which consists of components for acquiring an image of the negative during the printing process. Numerals 60, 65 and 70 denote, respectively, the aperture, the projection lens and the shutter. Numerals 80 and 90 denote two print material cassettes which supply print materials for producing 2D or 3D photographs. It is understood that more print material cassettes can be installed in the printer and that one or more cassettes may be transported to different locations during the printing process. Furthermore, the cassettes can be stacked up, instead of being installed side by side. Numeral 100 denotes an easel which is used to pick up a section of the print material from one of the print material cassettes and to hold this material at a proper position on the easel during the entire printing process. Numeral 120 denotes a chemical processor which processes exposed print materials released by the easel.

In the 2D printing mode, the printing does not require the movement of the projection lens and print material. It is preferred that cassette 80 is used for 2D print material and cassette 90 for 3D print material. In the 2D mode, as soon as the easel 100 picks up a section of print material from the print material cassette 80 and holds the print material at a proper position, image projection may start. When image projection is completed, the exposed print material can be directly released into the chemical processor 120 for processing.

The moving directions of various components in the printer are indicated by three isometric axes: X, Y and Z. Numerals 51 and 52 denote two video monitors. Preferably, one monitor is for displaying images and the other for displaying texts.

Using such a dual-mode machine, a photolab can make 2D and 3D prints with one printer. The most notable advantages of using a dual-mode printer over using two dedicated printers are the lower cost of printing equipment, the saving of lab space and the ease of operations. However, in order to make the dual-mode operations most practical, the dual-mode printer should meet certain criteria which include 1) that the operating procedure and the product formats of the dual-mode machine should be similar to or consistent with those of the dedicated machines, 2) that the switching between 2D and 3D modes should not require laborious efforts nor disrupt the printing operations, and 3) that the dual-mode machine should be designed such that most of the components on the printer are shared by 2D printing and 3D printing. The last criterion states that a dual-mode printer is not simply a linkup of two dedicated printers. To meet the second criterion, the dual-mode printer should not require the manual change of print materials when switching between 2D printing and 3D printing.

In spite of the fact that there are vast differences between 2D printing and 3D printing, many of the mechanical, optical and computing components of the present invention can be used for both modes. These components will be separately discussed in the following.

1. Lamphouse - One lamphouse can be used in both 2D printing and 3D printing.

2. Film carrier - A film carder is a mechanical assembly used for moving a negative or a set of negatives to a proper position under the lamphouse for exposure. This proper position will be hereafter referred to as the exposure position. In general, the negative format for 2D printing is different from that for 3D printing. For example, the 2D negatives made on a 135 film usually adopt a "full-frame" format while the 3D negatives made on a 135 film usually adopt a "half-frame" format. It should be noted that if a 2D/3D dual-mode camera is available to take 2D and 3D photograph, then it is possible that a film has negatives with a mixed format where full-frames and half-frames are recorded on the same roll of film. It is essential that the film carder can be used to accommodate films with different negative formats so long as these films are of the same size. In that case, different rolls of films can be spliced together. In order that the same printer can be used to make prints from negatives on different film sizes such as 110 films, 120 films and so on, the film carders may be designed so that they can be removed and replaced. It is understood that other mechanical components such as rollers, spools and motors are required to move the film.

3. Image acquiring and analyzing means - An electronic camera such as a CCD camera can be used to capture the image on a negative. The captured image can be displayed on a video monitor for viewing or digitized by a frame grabber board which sends the digitized data to a computer for density and color analysis. In a dual-mode printer, one density and color analysis program can be used to analyze both 2D negatives and 3D negatives. In order that the electronic camera is used to its full capacity regarding the image resolution, it is desirable to use a zoom lens on the electronic camera so that the camera can view a full image regardless of the negative format. Accordingly, the electronic camera should also be equipped with a zoom controlling means. Furthermore, 3D printing requires that images on different frames in a set of negatives be properly aligned so that these images can be projected on the same print material to make a 3D photograph. Thus, the same electronic camera can be used to acquire all the images in a set of negatives and send the image information to the computer for image alignment.

4. The projection lens - In principle, the same projection lens may be used to print 2D negatives and 3D negatives. However, due to the fact that 3D negatives and 2D negatives adopt different formats, the magnifications for 2D printing and 3D printing may be different. It is essential that the projection lens accommodate different magnifications. One way to accomplish this is to use a zoom lens along with a zoom controlling means which changes the magnification according to the printing mode. Another way to accomplish this is to use a number of different lenses mounted on a turret which rams to a proper location according to the required magnification. It should be noted that in 3D printing the projection lens must be moved to different positions so that different images in a set of negatives can be projected to the pit material at different angles. All the lenses to be used in 3D printing must be able to cover the required projection angles. It is understood that an aperture and a shutter may be mechanically linked to the projection lens for exposure control and they are moved to different positions along with the projection lens for 3D printing.

5. Print material supplies - Because the print material for 2D photographs and that for 3D photographs are different, two pit material cassettes are installed in a dual-mode printer: one for 2D and one for 3D. With two cassettes installed in the printer, the operator does not need to change the print material when switching between 2D printing and 3D printing. The print material cassettes can be moved to different locations according to the printing mode. Alternatively, the print material cassettes can be installed in fixed locations while a movable easel will be used to pick up the proper pit material from the stationary cassettes according to the printing mode. The same easel can also be used to move the 3D print material to different positions to receive image projections at different angles.

6. Chemical processor - It is logical to include a chemical processing unit in the dual-mode printer so that chemical processing of photographs is a part of an on-line printing process. Only one chemical processor is needed to process both 2D prints and 3D prints if the photographic emulsions on both print materials are compatible. However, due to the protective backing on the 3D print material, a 3D print usually requires a longer processing time than a 2D print. This processing time difference can be facilitated by changing the speed of the transport mechanism of the processor according to the printing mode.

In the dual-mode printer, the printing mode is selected by an operator in accordance with the negative format of the film, or it is selected by a mode identifying means based on a machine-readable code exposed on the film at the time of picture taking. It is understood that only cameras equipped with code exposing means will be able to put such a code on film.

Figure 2A:
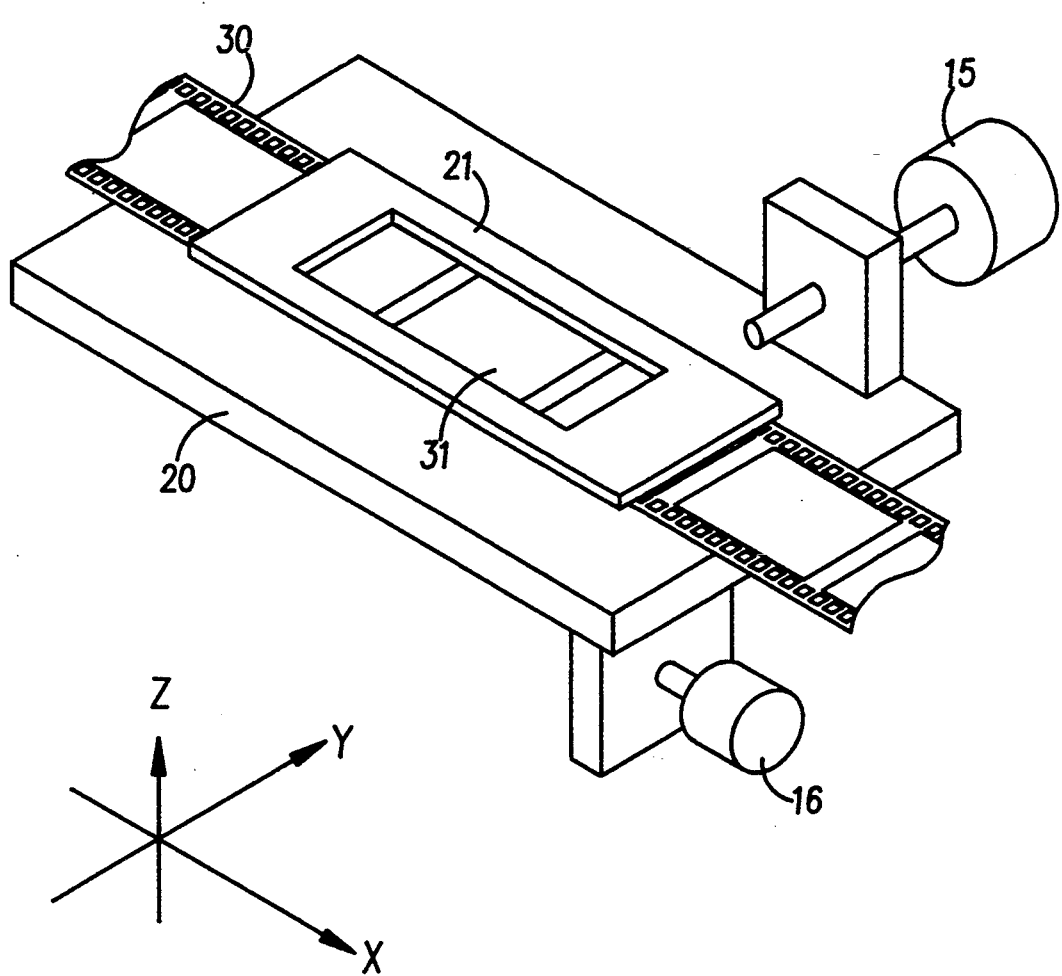
FIG. 2a to FIG. 2c are schematic isometric views of a film carrier portion of the printer of FIG. 1, shown with a negative holder which is used to hold the film in place during the printing process.
Figure 2B:
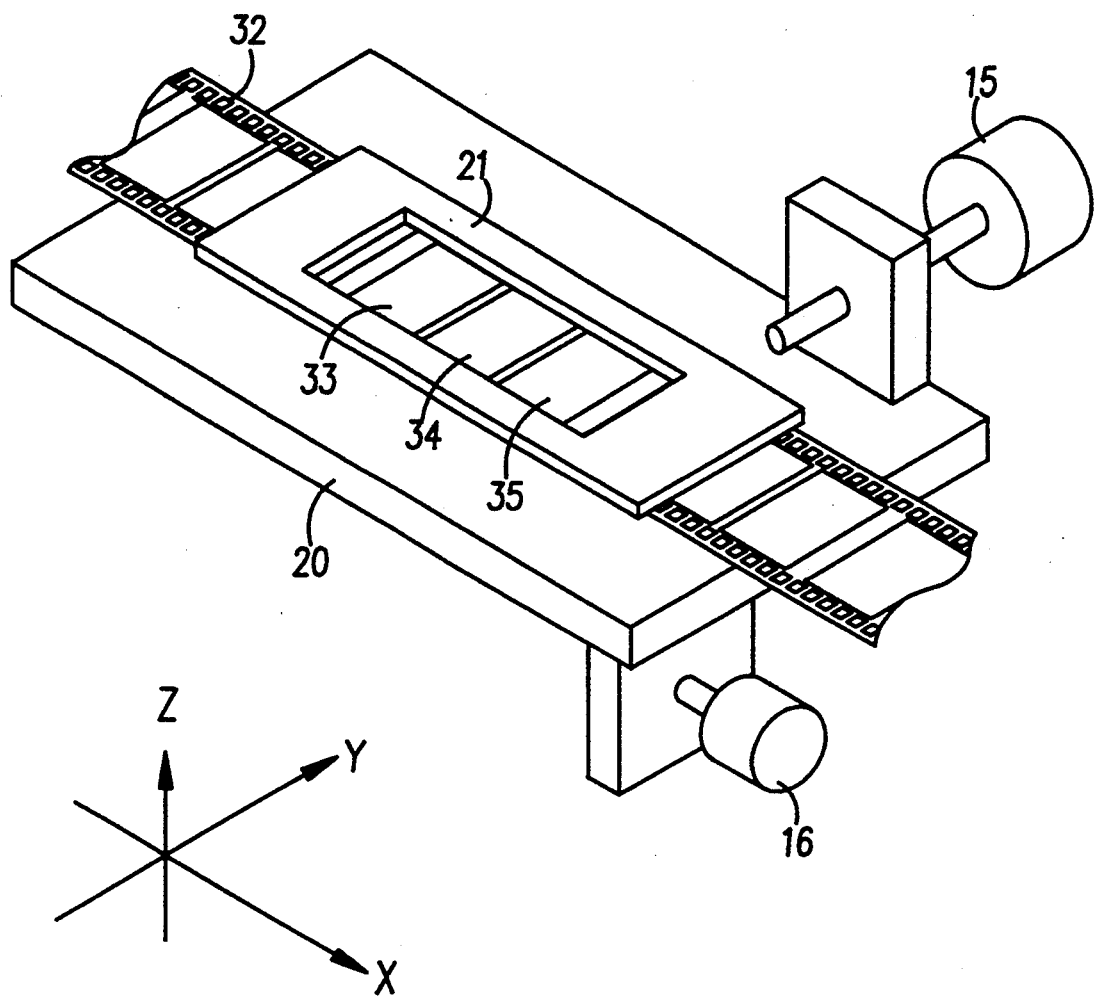
Figure 2C:
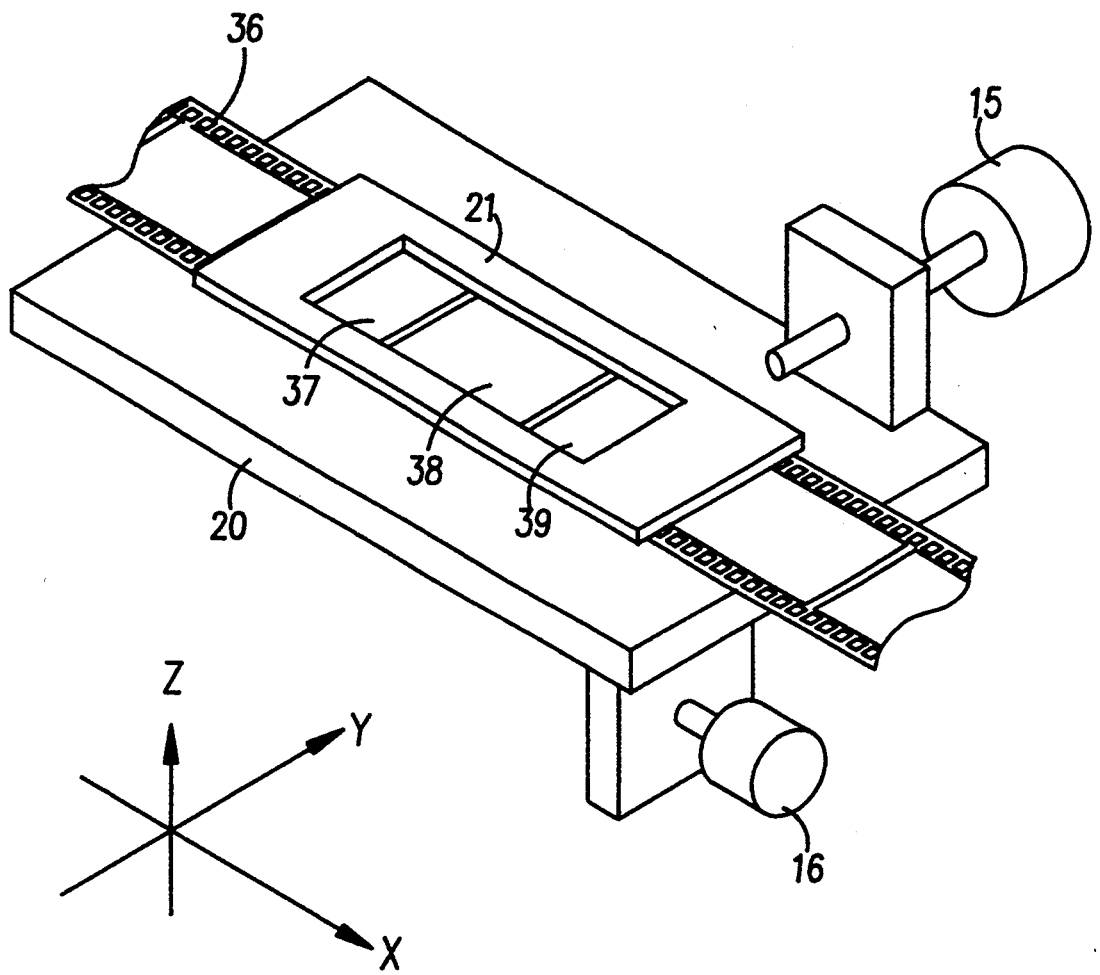

FIG. 2a to FIG. 2c illustrate a film carder on which a negative holder 21 is used to hold down the film during printing. The opening on the negative holder is sufficiently wide to accommodate different negative formats. The film carder is driven by a motor 16 so that it can transport the film along the X axis. Film movement in the X direction is mainly used in 3D printing for bringing different frames in a set of negatives, one at a time, to the exposure position so they can be projected on the print material. A motor 15 is used to adjust the position of the negatives in the Y direction. Position adjustment in the Y direction is for aligning different images in a set of negatives before they are projected on the print material to make a 3D print. The film held in position by the negative holder 21 can be released manually or automatically by a mechanical device so that different sections of the film can be moved into the film carder. It is understood that the film is moved, relative to the negative holder, by mechanical components such as spools, rollers and motors. In order that films of different sizes, such as 110, 120 and 135, can be printed, the film carder may be removable from the machine so it can be replaced by another film carder for a different film size.

FIG. 2a illustrates the film carder when a film 30 with a 2D negative format is engaged in the negative holder 21. Numeral 31 denotes one of the 2D negatives on the film, If the 2D negatives are taken with a 35 mm camera on a 135 film, the size of the image frame is usually referred to as the full-frame format.

FIG. 2b illustrates the film carder when a film 32 with a 3D negative format is engaged in the negative holder 21. Numerals 33, 34 and 35 denote three image frames in a set of negatives for composing a 3D photograph. If the 3D negatives are taken with a multi-lens camera on a 135 film, the image frame is usually half of the full-frame and its size is referred to as the half-frame format. It is understood that the number of frames in a set of negatives for composing a 3D photograph can be any number which is equal to or larger than 2. As shown, the opening on the negative holder 21 is sufficiently large to show the image areas of all frames in a set of negatives for 3D printing.

FIG. 2c illustrates the film carder when a film 36 with a mixed format is engaged in the negative holder 21. As shown, numeral 38 denotes a full-frame intended for 2D printing while numerals 37 and 39 denote half-frame negatives. Part of the full-frame 38 may also be used along with the half-frames 37 and 39 for composing a 3D photograph. It is understood that the number of frames in a set of negatives with a mixed format can be any number which is equal to or larger than 2 and that the full-frame can be on the side or in the middle of a set of negatives.

Figure 3:
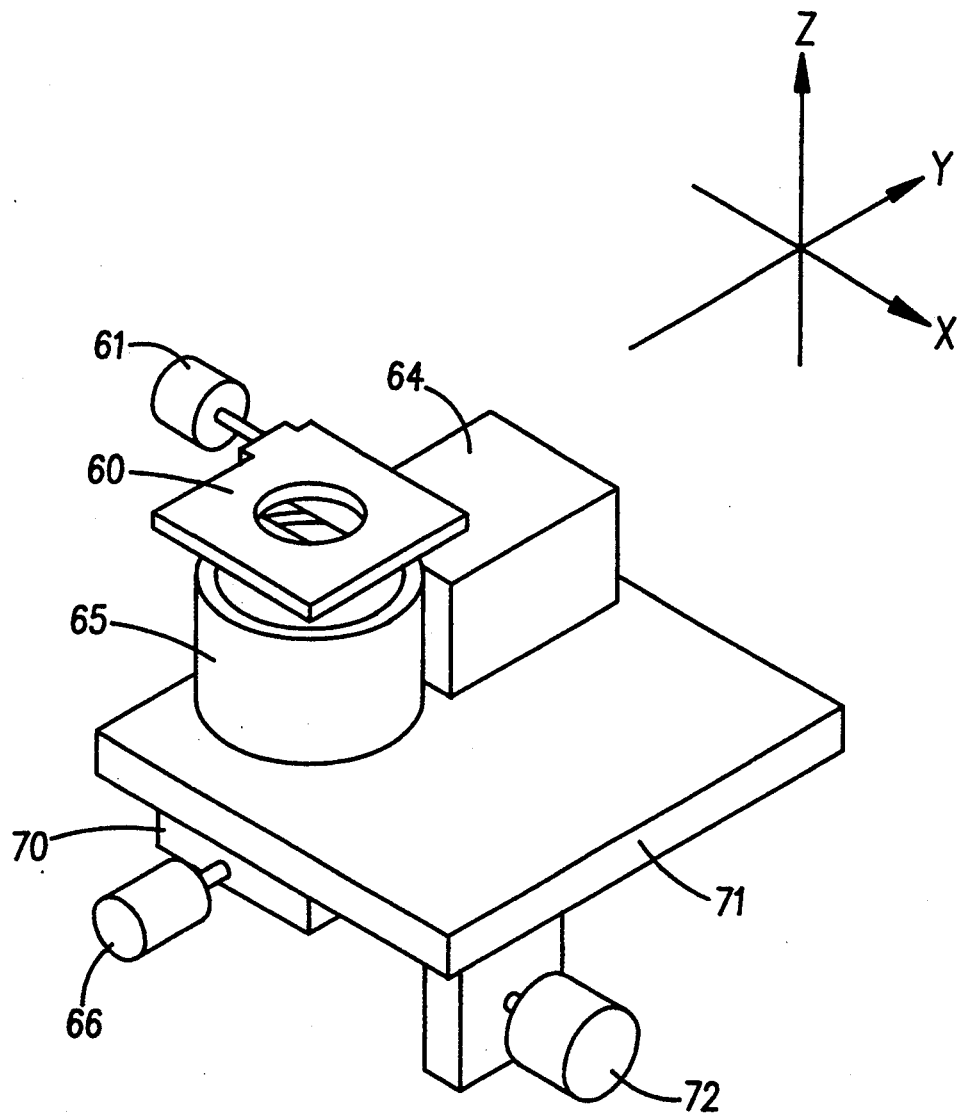
FIG. 3 is a schematic isometric view of a portion of the printer of FIG. 1, namely a platform on which the projection lens, the shutter, the aperture and their controlling mechanisms are mounted.

FIG. 3 illustrates a platform 71 on which an aperture 60, a projection lens 65, and a shutter 70 are mounted. The platform is driven by a motor 72 so that all the components on the platform can be moved altogether to different positions along the X axis. The aperture controlling mechanism 61 is used to adjust the size of the aperture 60; the shutter controlling mechanism 66 is used to open or close the shutter 70; the project lens 65 shown in FIG. 3 can be a zoom lens and the magnification is adjustable by a zoom controlling mechanism 64. The zoom lens is used here to accommodate different print sizes and image frame sizes.

Figure 6:
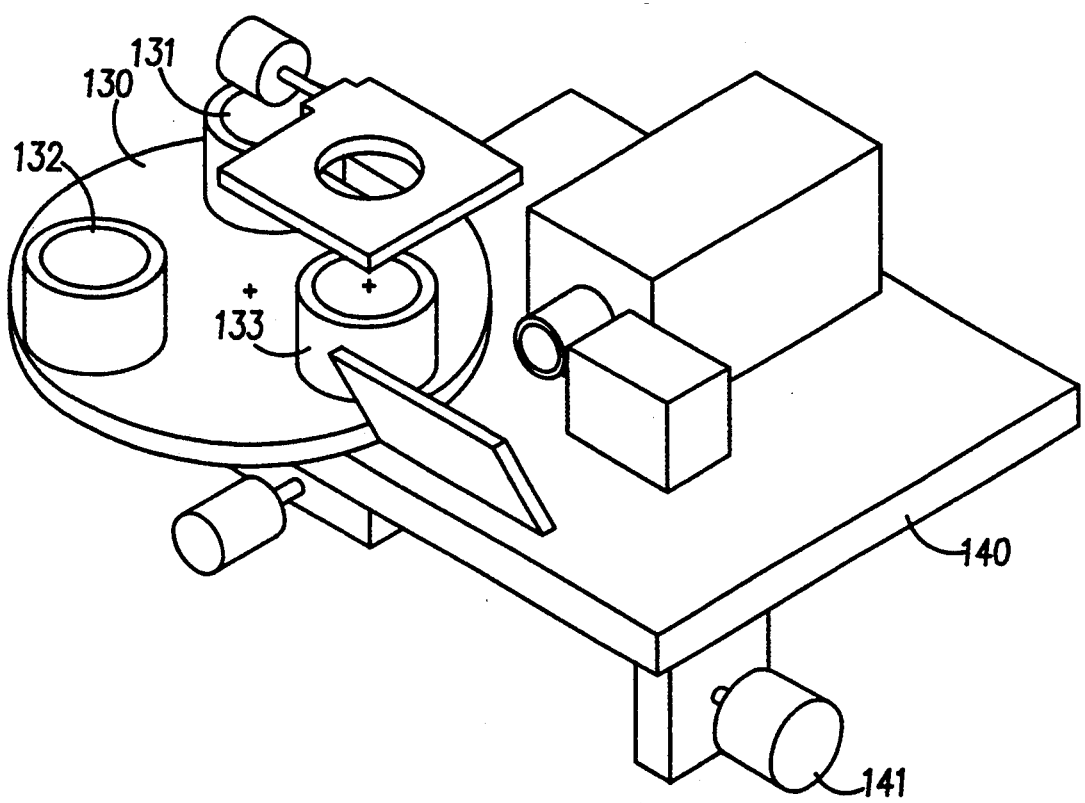
FIG. 6 is a schematic isometric view of a modified portion of the printer of FIG. 1, namely a platform with a turret containing a plurality of projection lenses instead of a single zoom lens.

Alternatively, a turret containing a plurality of lenses is used instead of a zoom lens so that one lens is selected to suit a required magnification, as shown in FIG. 6.

Figure 4:
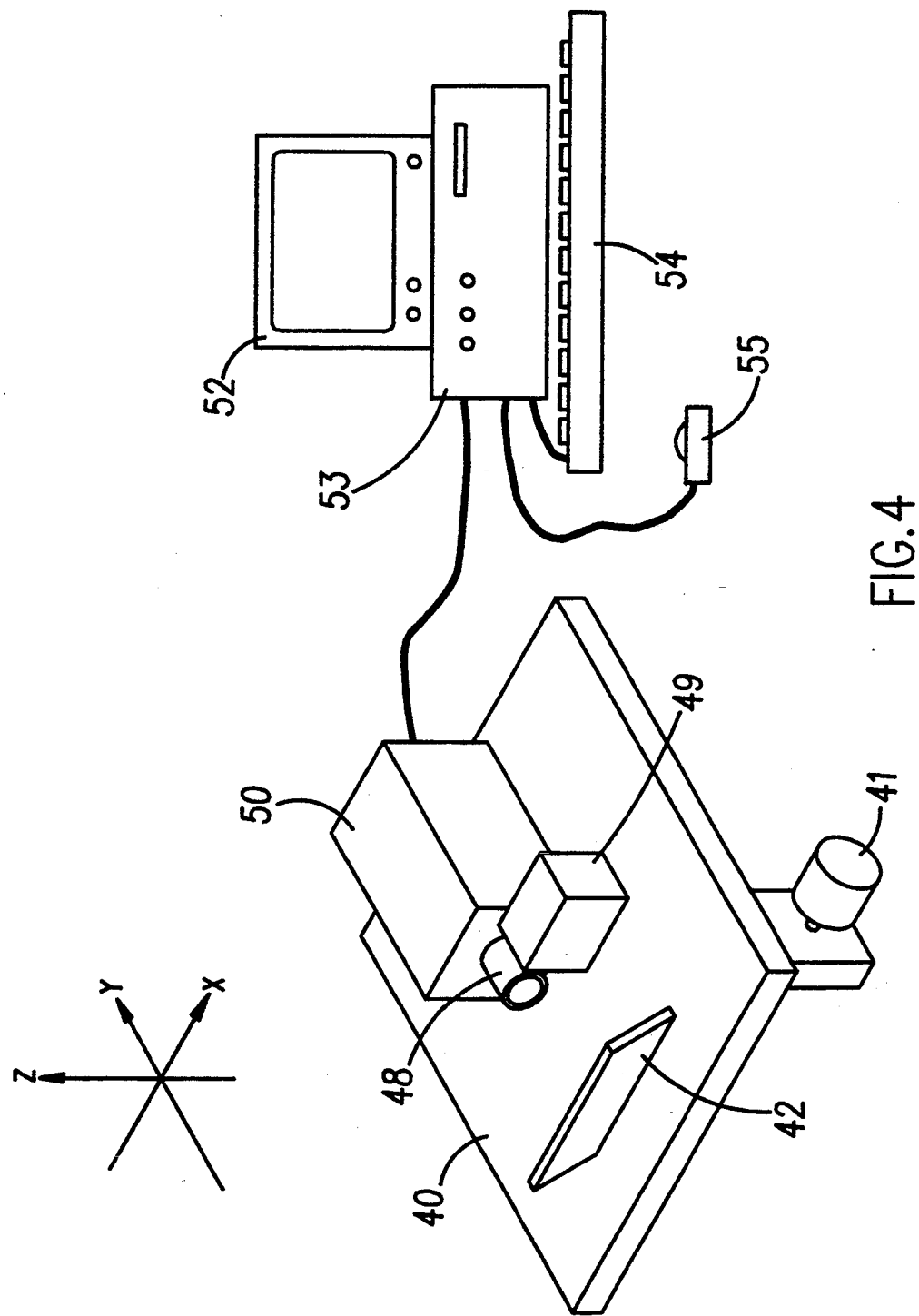
FIG. 4 is a schematic isometric view of a portion of the printer of FIG. 1, namely an optical assembly for image acquisition.

FIG. 4 illustrates a platform 40 on which the optical components for image acquisition are mounted. The platform is driven by a motor 41 so that it can be moved out of the way when the negative image is projected on the print material. Numeral 50 denotes an electronic camera equipped with a zoom lens 48 and a zoom controlling mechanism 49. The zoom lens is used here so that an image frame of any format can be viewed in full or in part. The camera views the negative image through the reflection from a plane mirror 42 which is placed at an angle, preferably 45 degrees to the XY plane and the XZ plane. The image captured by the camera 50 is digitized by an image digitizer inside or outside the computer 53. The acquired image can be displayed on a video monitor 52. Another video monitor 51, as shown in FIG. 1, may be used to display texts put out by the computer 53. The computer is equipped with a keyboard 54 and a tracking device 55 such as a trackball, a mouse or a joystick. These peripherals are used for data input or giving commands to the computer by an operator. It is advantageous to acquire the image of the negative by an electronic camera. If the color and density are analyzed automatically, then it is also desirable to use an image digitizing means to collect the image information and channel this information to a computer for analysis.

In 3D printing, because the plurality of images in a set of negatives must be projected onto a single piece of print material to produce a composite 3D photograph, it is required that these images be properly aligned. In contrast, image alignment is not necessary in 2D printing because only one image is projected on the print material to produce a 2D photograph.

Figure 5:
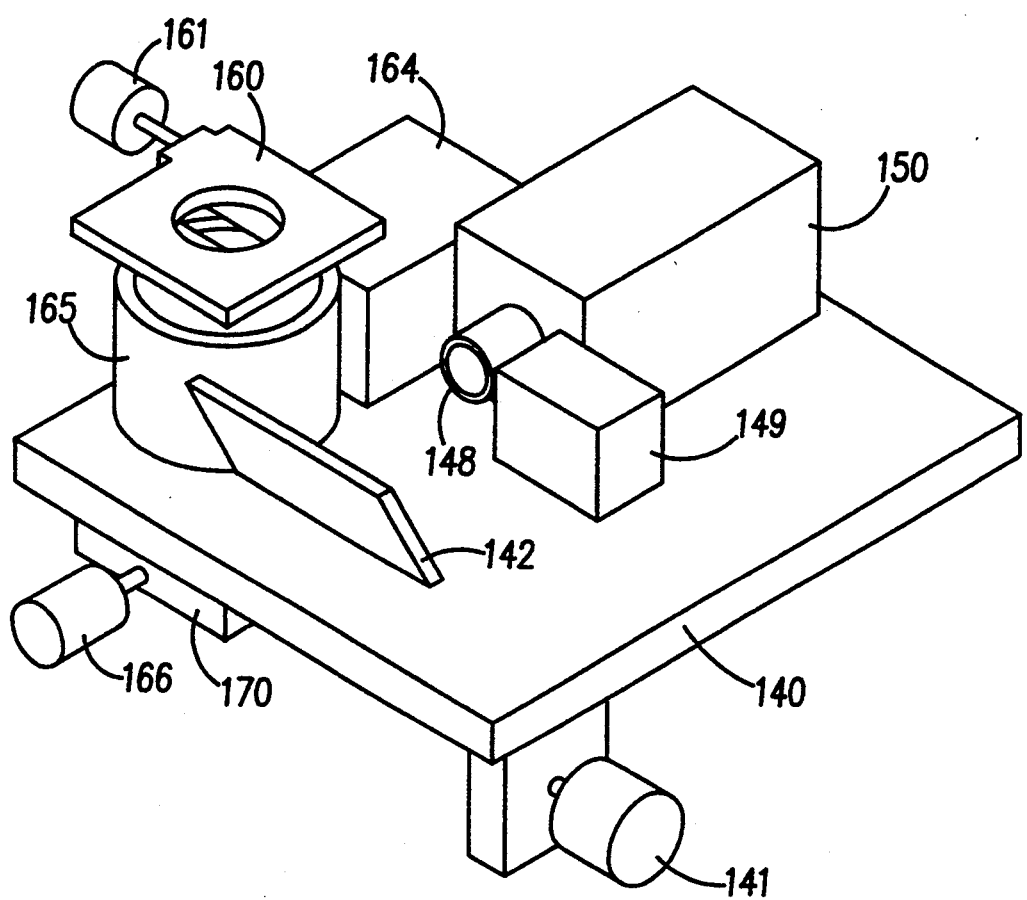
FIG. 5 is a schematic isometric view of a portion of the printer of FIG. 1, showing a platform on which the image acquiring optics, the projection lens, the shutter, the aperture and the controlling mechanisms are mounted.

Alternatively, the image acquiring optics can be mounted, along with the projection lens, the aperture and the shutter, on the same platform as shown in FIG. 5.

FIG. 5 shows a platform 140 on which the acquiring optics, the projection lens, the shutter and the aperture are mounted. The platform 140 is driven by a motor 141 so that it can be moved to different positions along the X axis. In FIG. 5, the electronic camera, its zoom lens and the zoom controlling means are denoted, respectively, by numerals 150, 148 and 149. The camera views the negative image through a plane mirror 142. The aperture and the aperture controlling mechanism are denoted by numerals 160 and 161; the projection lens 165 is a zoom lens and its zoom controlling mechanism is denoted by numeral 164; the shutter and the shutter controlling mechanism are denoted by numerals 170 and 166.

FIG. 6 shows a variation of the design shown in FIG. 5. As shown in FIG. 6, a plurality of lenses are mounted on a turret 130 which can be rotated to different locations so that a proper lens is used according to the desired magnification. Numerals 131, 132 and 133 denote three different lenses on the turret.

Figure 7:
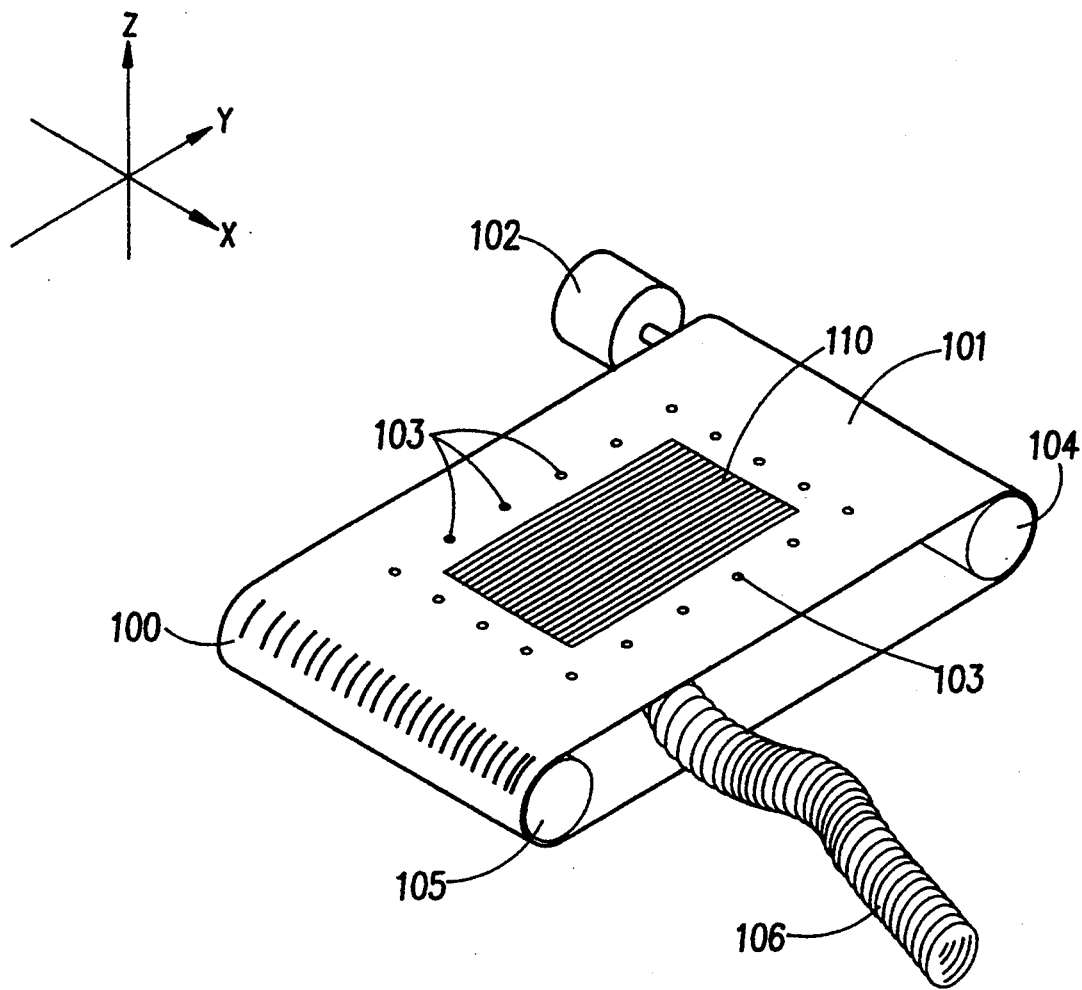
FIG. 7 is a schematic isometric view of a portion of the printer of FIG. 1, namely an easel for picking up a section of print material from a print material cassette and holding the same in place during the printing process.

FIG. 7 illustrates an easel 100 which is used to pick up a section of print material from one of the print material cassettes and to hold the print material in place during printing. The print material 110 is held by vacuum suction through an array of suction holes 103 on a conveyor belt 101. Vacuum suction is achieved by drawing air through a suction hose 106. The conveyor belt is driven by a motor 102 and rollers 104 and 105. The entire easel is driven by a motor, which is not shown, to different positions along the X direction. In particular, during the 3D printing process, the easel is moved to different positions so that different images in a set of negatives are projected onto the print material at different angles. It should be noted that the lenticules on the lenticular material for 3D printing are parallel to the Y axis, as shown in FIG. 7. After the print material is exposed, the easel will bring the print material to the chemical processor and release it for processing.

Figure 8:
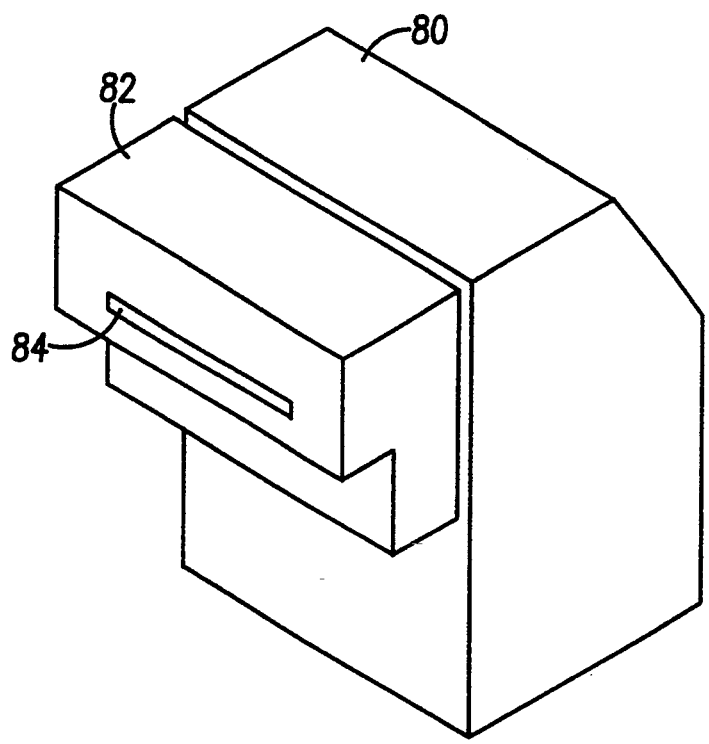
FIG. 8 is a schematic isometric view of a portion of the printer of FIG. 1, namely a print material cassette.

FIG. 8 illustrates a print material cassette 80 which can be attached to a feeder/cutter assembly 82. The cassette is used to house a roll of print material which is fed through the feeder/cutter assembly. The feeder/cutter assembly is equipped with driving components such as rollers and motors, and cutting components such as a cutting blade and an actuator. The driving components are used for moving the print material through the outlet 84. The cutting blade is used to cut a section of the print material to a proper length before the print material is picked up by the easel 100 shown in FIG. 7. The print material cassette 90 shown in FIG. 1 can be similar to the cassette 80 shown in FIG. 8.

Figure 9A:
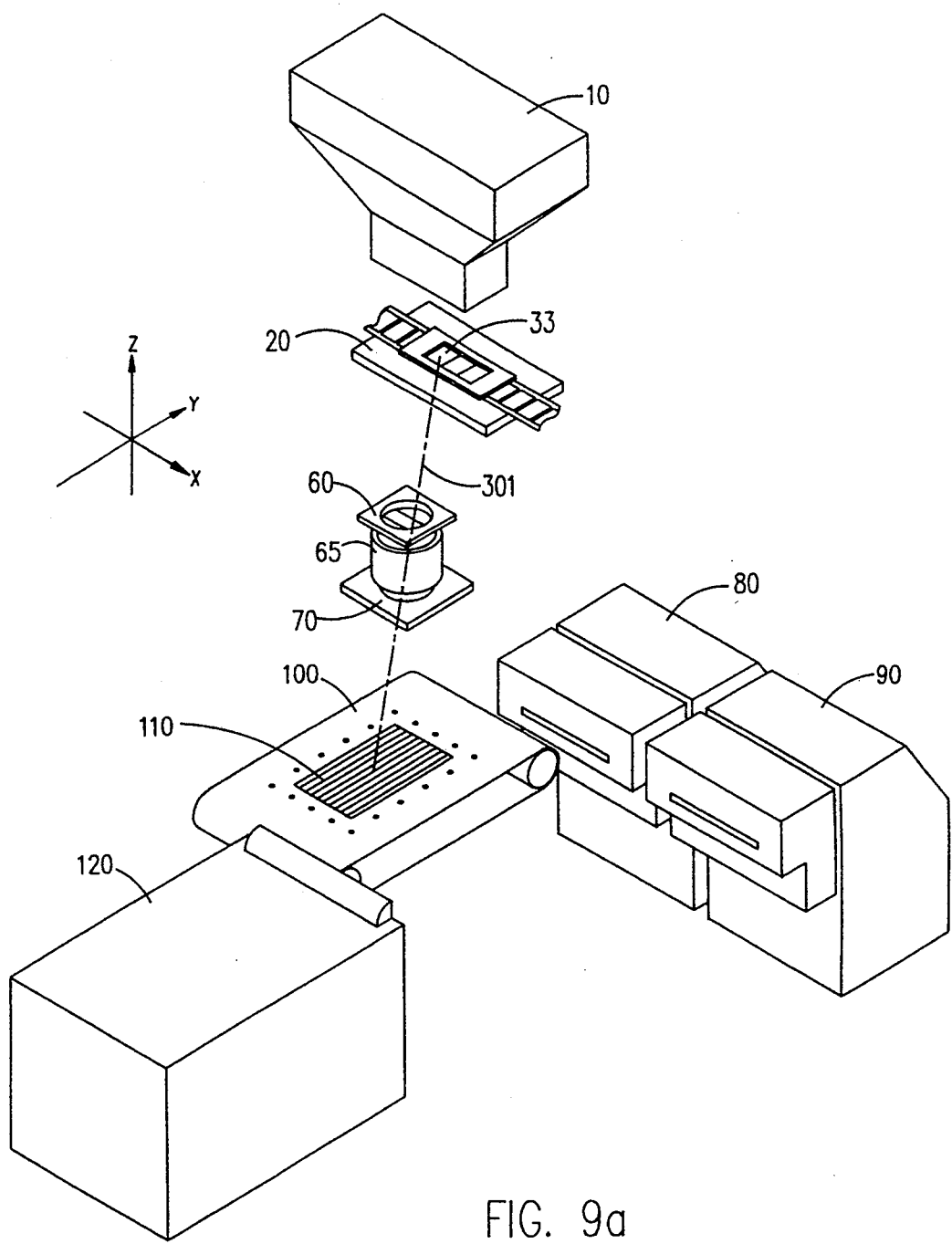
FIG. 9a to FIG. 9c show different positions of various components of the printer of FIG. 1 during a typical 3D printing process.
Figure 9B:
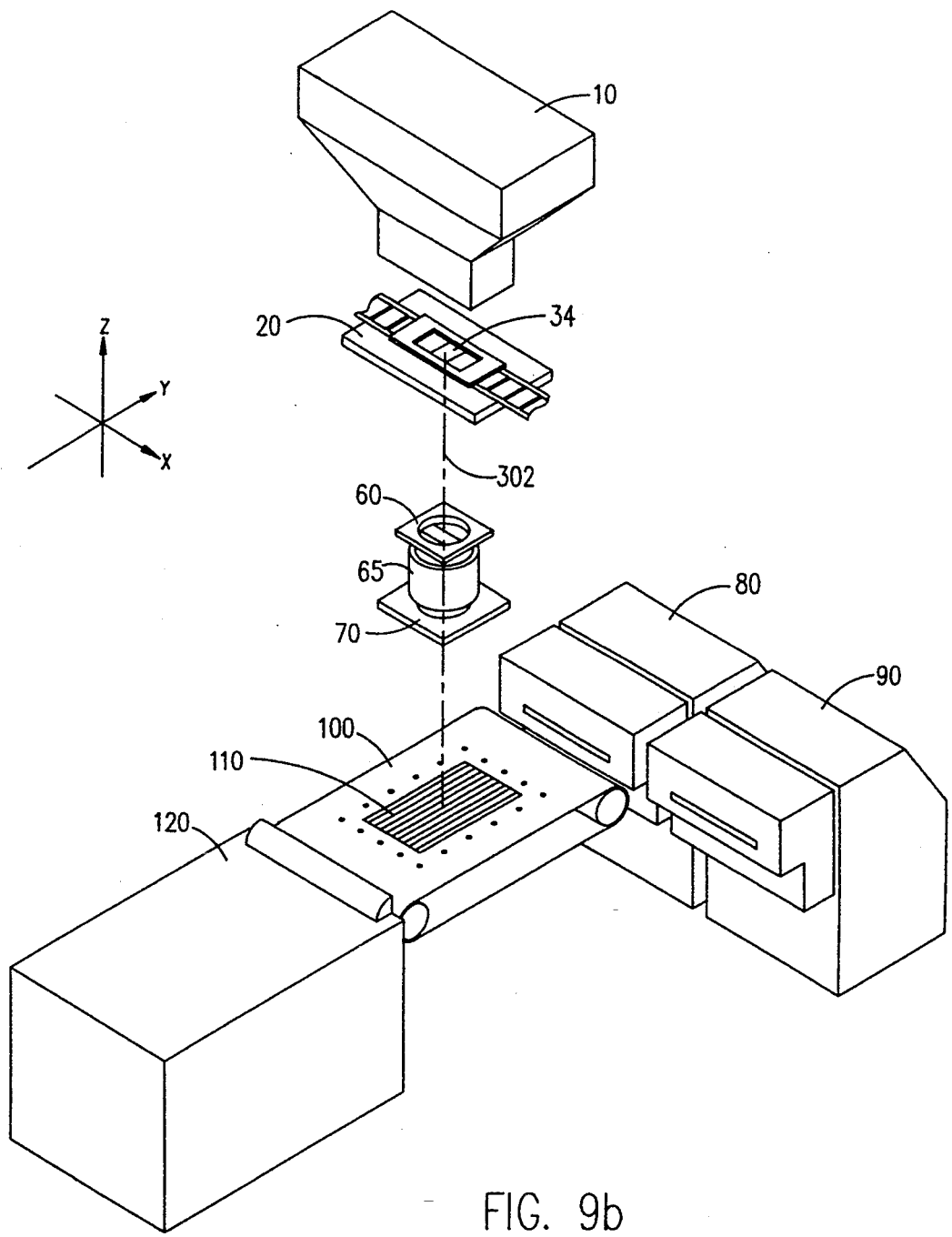
Figure 9C:
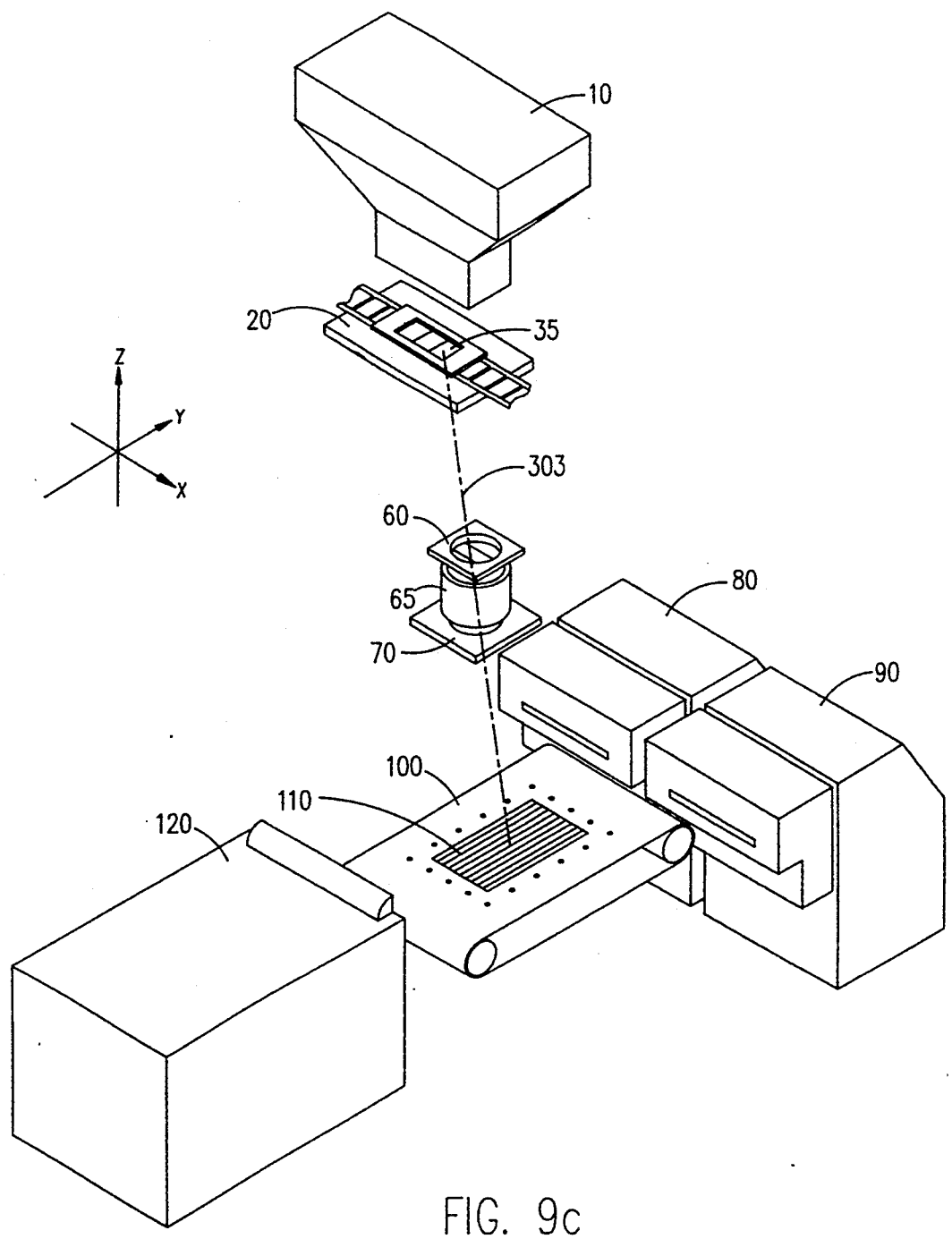

FIG. 9a to FIG. 9c illustrate the different positions of various components during a typical 3D printing process. These components include the film carder 20, the aperture 60, the projection lens 65, the shutter 70, and the easel 100. The easel holds a section of the print material 110. The illustrations are made with the assumption that three image flames in a set of negative are used to compose a 3D photograph. It is understood that if the 3D print material is housed in the print material cassette 90, then, prior to printing, the easel 100 is moved to the cassette 90 to pick up a section of print material and hold it in place. After exposure of three images at three different angles is completed, the exposed material is brought to the chemical processor 120 for processing.

FIG. 9a shows the projection of a side frame 33 in a set of negatives on the print material 110. The projection angle at this particular position is represented by a broken line 301.

FIG. 9b shows the projection of the middle frame 34 in a set of negatives on the print material 110. The projection angle at this particular position is represented by a broken line 302.

FIG. 9c shows the projection of another side frame 35 in a set of negatives on the print material 110. The projection angle at this particular position is represented by a broken line 303.

Figure 10:
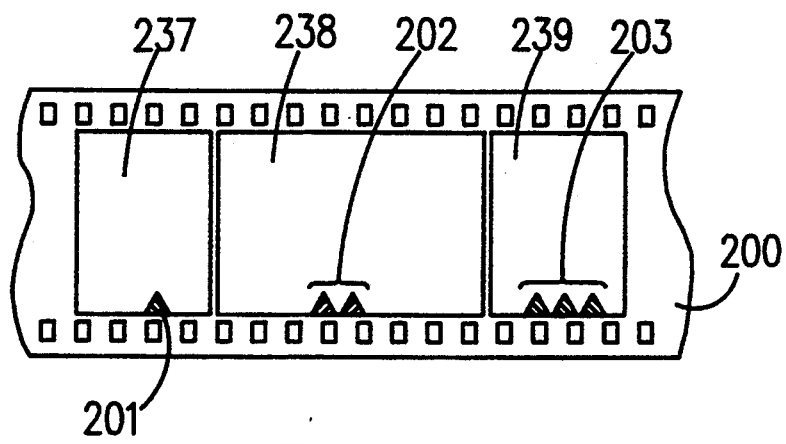
FIG. 10 shows an example of the 2D/3D discrimination code exposed on a film taken with a mixed-format camera.

FIG. 10 illustrates an example of the 2D/3D discrimination code on a film taken with a mixed-format camera. FIG. 10 shows a film 200 with a set of negatives exposed with a mixed format, similar to those shown in FIG. 2c. As shown in FIG. 10, the negative set consists of a full-frame 238 and two half-frames 237 and 239. A code can be exposed on the film near the edge of the frames. As shown, codes 201 and code 203 indicate the half-frames while code 202 indicate the full-frame. Code 201 and code 203 are different so that the printer can identify which side frame is on the left side and which on the right side of the negative set.

Figure 11:
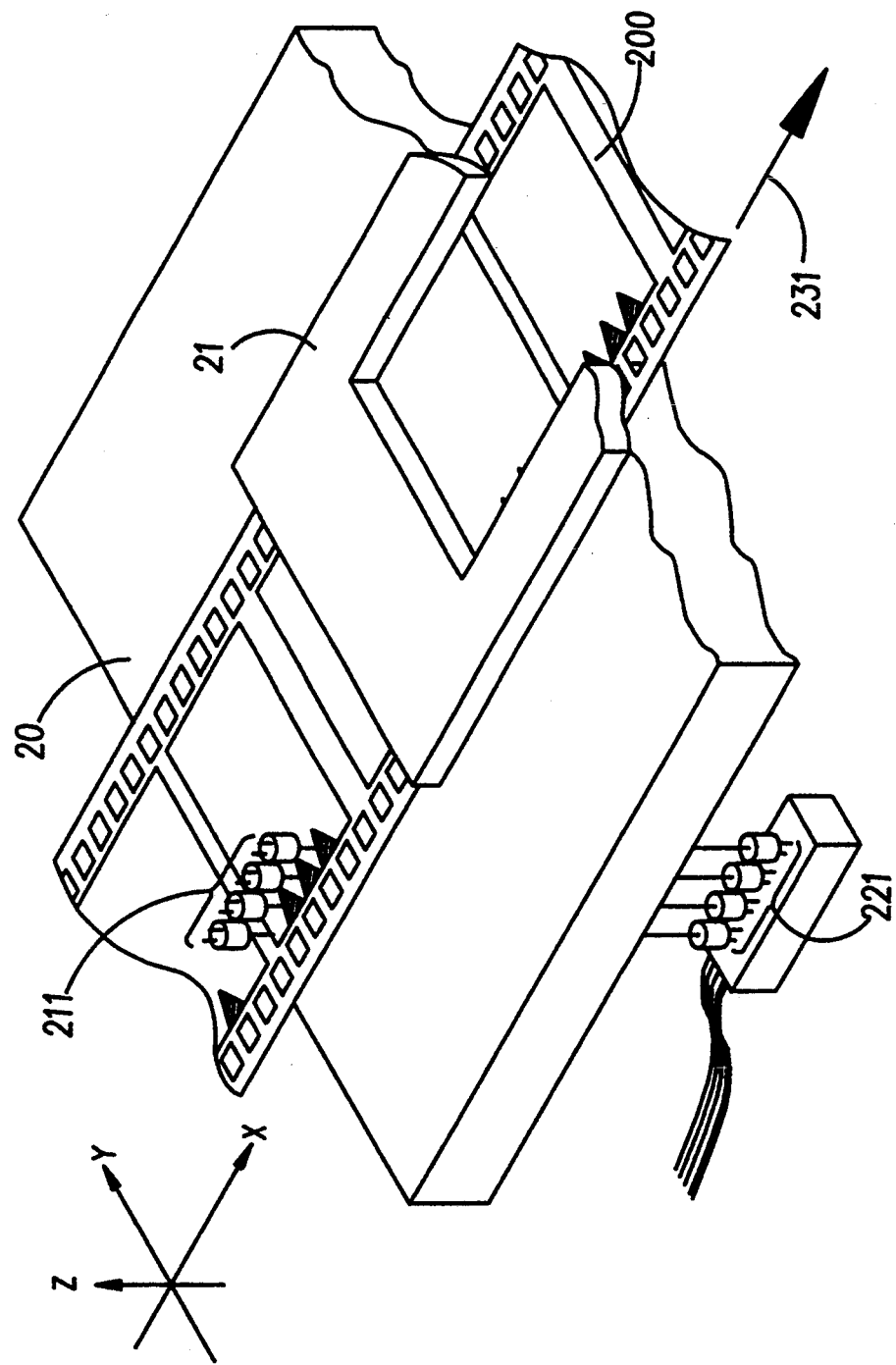
FIG. 11 is a partially cut-away isometric view of the printer of FIG. 1 showing an example of mode identifying mechanism.

FIG. 11 illustrates an example of code identifying means that can be installed on the dual-mode printer. As shown in FIG. 11, light sources such as light-emitting diodes, collectively denoted by numeral 211 are mounted on one side of the film 200 while a row of photo sensors, collectively denoted by numeral 221 are mounted on the other side to detect the light emitted by the light sources as the film passes by. As shown in FIG. 11, the light sources and photosensors are mounted on the film carder 20 such that the code is read before the negative frames enter the negative holder 21. The moving direction of film as the negative frames enter the negative holder is indicated by an arrow 231. These light sources and photosensors can also be mounted on and beneath the negative holder 21 to identify the code after the negative frames are moved into the negative holder area.

In the preferred embodiment according to the present invention, the projections at different angles for making a 3D photograph are achieved by transporting the projection lens and the print material to different positions. Accordingly, the lamphouse of the printer can be stationary throughout the printing process.

METHOD OF OPERATIONS

The following description of the method of operations illustrates the principle of the dual mode 2D/3D printer, according to the preferred embodiment of the present invention. It should be noted that the description is based on the assumption that a 3D photograph is composed of three 2D images on a set of negative frames.

Every time a new negative or set of negatives is transported into the negative holder area, either the operator or the printer will decide whether a 2D or a 3D photograph will be made. The printer will start a printing cycle based on the selected printing mode. However, the 2D printing cycle and the 3D printing cycle share some common steps such as picture cropping and density/color analysis. The picture cropping step allows the operator to choose the best image area on the negative to be printed while the density/color analysis is usually carded out automatically by the printer to determine the exposure time and color filtering. After these steps, the printing will be carded out according to the 2D mode or the 3D mode, as described in the following.

2D Mode

1. The easel returns to the 2D print material cassette position.
2. A section of the 2D photographic paper is brought out of the cassette and is cut.
3. The easel picks up the photographic paper and holds it in place.
4. The shutter opens for exposure and doses afterward.
5. The exposed photographic paper is released into the chemical processing unit for processing and drying.

3D Mode

1. The easel returns to the 3D print material cassette position.
2. A section of the 3D print material is brought out of the print material cassette and is cut.
3. The easel picks up the print material and holds it in place.
4. The easel and the projection lens move to their first exposure positions.
5. The first negative frame moves to the exposure position.
6. The shutter opens for exposure and closes afterward.
7. The easel and the projection lens move to their second exposure positions.
8. The second negative frame moves to the exposure position.
9. The shutter opens for exposure and closes afterward.
10. The easel and the projection lens move to their third exposure positions.
11. The third negative frame moves to the exposure position.
12. The shutter opens for exposure and closes afterward.
13. The exposed print material is released into the chemical processing unit for processing and drying.

While the present invention has been described with reference to the preferred embodiment, it shah be understood by those skilled in the art that various changes may be made and equivalents may be substituted for elements thereof without departing from the spirit and scope of the invention as set forth in the appended claims.

What is claimed is

1. A dual-mode photographic printer for producing 2D and 3D photographs from 2D print material and 3D print material, said printer comprising:
 a print material storage and dispensing means for storing 2D print material and 3D print material and for selectively dispensing 2D print material and 3D print material;
 a movable easel associated with said print material storage and dispensing means for supporting 2D print material in a position for printing 2D photographs and further for supporting 3D print material in a first 3D printing position, for moving the 3D print material from the first 3D printing position to at least a second 3D printing position, and for supporting the 3D print material in the at least second 3D printing position;

a film carrier for transporting photographic film and supporting the photographic film;

a lamphouse for illuminating the photographic film; and a movable, variable-magnification projection lens means for, in cooperation with said lamphouse, projecting an image from the photographic film onto the print material.

2. A printer as claimed in claim 1 wherein said projection lens means comprises a zoom lens.

3. A printer as claimed in claim 1 wherein said projection lens means comprises a plurality of lenses mounted on a turret.

4. A printer as claimed in claim 1 wherein said print material storage and dispensing means comprises a first print material cassette for housing 2D print material and a second print material cassette for housing 3D print material.

5. A printer as claimed in claim 4 wherein said movable easel is adapted to be moved to different positions for picking up print materials from said first and second print material cassettes.

6. A printer as claimed in claim 5 wherein said movable easel is adapted to be moved to different positions so that different images in a set of negatives can be projected onto the print material at different angles.

7. A printer as claimed in claim 1 further comprising a shutter, an aperture, and means for moving said projection lens means said shutter, and said aperture to different positions so that different images in a set of negatives can be projected onto the print material at different angles.

8. A printer as claimed in claim 1 wherein said film carder is adapted for moving different frames of a set of negatives to proper positions so that different images in the set of negatives can be projected onto the print material at different angles.

9. A printer as claimed in claim 1 further comprising a feeder/cutter assembly associated with said pit material storage and dispensing means so that a section of the print material can be moved out of said print material storage and dispensing means and cut before the section of print material is positioned on said easel.

10. A printer as claimed in claim 1 wherein said movable easel is further adapted for moving the 3D print material from the second 3D printing position to a third 3D printing position, and for supporting the 3D print material in the third 3D printing position.

11. A printer as claimed in claim 1 further comprising a chemical processor associated with said movable easel.

* * * * *